2,997,851
PEDAL-ACTUATED TAP
René Trubert, 6 Ave. du General Gouraud, and Michel Trubert, 8 Ave. du General Gouraud, both of Viroflay, France
Filed Aug. 26, 1957, Ser. No. 680,141
Claims priority, application France Sept. 20, 1956
1 Claim. (Cl. 60—54.6)

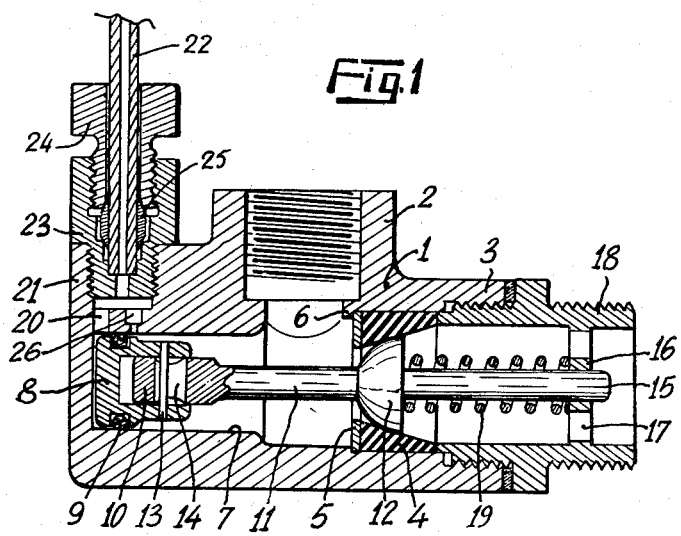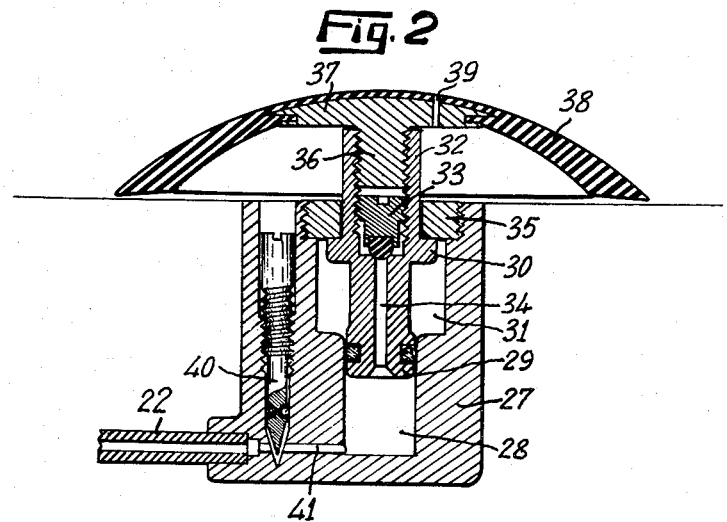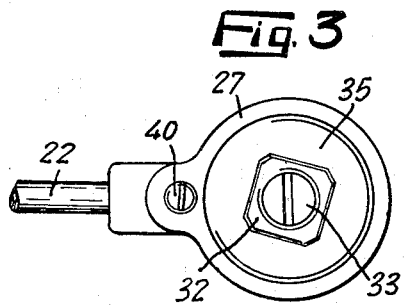

This invention relates to taps and has specific reference to a pedal-actuated tap intended more particularly for taking water or feeding apparatus connected to a water supply system delivering water under pressure, such as a town supply system.

The tap is of the general, well-known type comprising between the control pedal and the output obturator or regulating member to be controlled a hydraulic transmission the automatic filling of which is ensured by the same liquid delivered by the tap which acts on a piston connected to the tap plug.

In taps of this general type it is essential for the proper operation of the system to prevent the hydraulic transmission from being filled with liquid when the piston is in its forward position in which the tap is open, for this undesired filling would subsequently prevent the piston from moving backwards when the pedal is released, and therefore the tap would remain open.

Now it is the object of this invention to avoid this risk in a definitely reliable manner, irrespective of the actions exerted on the pedal and of the other conditions of operation of the tap.

The essential feature of the invention consists in that the tap piston is sealed and acts as a slide valve controlling an orifice for filling the pipe constituting the hydraulic transmission, whereby the communication between the liquid inlet and the hydraulic transmission line is effected through this orifice but only when the piston has moved back to a position corresponding to the closed position of the tap.

In order to afford a clearer understanding of the present invention and of the manner in which the same may be carried out in practice, reference will now be made to the attached drawing forming part of this specification and illustrating diagrammatically by way of example a typical embodiment of the invention. In the drawing:

FIGURE 1 is an axial section showing the tap body to which one end of the hydraulic transmission line is connected;

FIGURE 2 is a vertical axial section showing the pedal control device; and

FIGURE 3 is a plane view from above showing the pedal control device, without the pedal proper.

The tap body 1 comprises a water-inlet pipe connection 2 and a water-outlet pipe connection 3 having their axes disposed at right angles to each other. Between these pipe connections the body 1 comprises a cavity adapted to receive the seat 4 of the obturator or tap plug. In the example illustrated this seat is detachable and adapted to be extracted through the outlet connection 3 while being coaxial thereto and bearing internally against a washer 5 retained by an annular shoulder 6 formed inside the body 1.

In axial alignment with the water-outlet pipe connection 3 and on the other side of the water-inlet pipe connection 2, the body 1 has a cylindrical bore 7 in which a piston 8 having a piston-ring 9 is slidably mounted. This piston 8 is hollow and adapted to receive the head 10 of the rod 11 of an obturator or plug 12 co-acting with the seat 4. The piston 8 may slide to a certain extent relative to the head 10 before engaging same to unseat the obturator 12, a cross-pin 13 extending for this purpose through a slot 14 formed in the head 10 connecting the piston with the head and therefore with the plug 12 with a certain axial clearance, the arrangement permitting in addition the easy removal of the plug-seat-piston assembly through the outlet connection 3. On the outlet side of the tap the obturator or plug 12 has a shank-like extension 15 constituting a guide member slidably engaging an adequate bearing 16 formed centrally of a spider-like or perforated wall 17 formed integrally with a union or like member 18 screwed in the outlet aperture 3. A spring 19 is positioned between the plug 12 and the wall 17 to constantly urge the plug against its seat 4 and close the tap.

The bottom of the cylinder 7 communicates through a hole 20 with the interior of a tapped connection 21 formed in the body 1 and adapted to receive one end of a relatively thin pipe line 22 constituting the hydraulic transmission. Thus, the tapped hole of connection 21 may receive a screw fitting or coupling 23 receiving in turn the hollow screw 24 through which the corresponding end of the pipe 22 is fitted, so that when the screw 24 is screwed it clamps a double-taper ring member 25. A gasket (not shown) may also be provided between the connection 21 and coupling 23 if the latter is of the detachable type. The interior of the connection 21 communicates with the cylinder 7 through a small filling orifice 26 formed through the lateral wall of the cylinder 7 and so located that when the piston is in its normal, rearmost position (as illustrated in the drawing) this orifice communicates with the tap inlet, while this communication is discontinued by the piston itself during the initial portion of its travel and before it actuates the plug.

The pipe 22 has its other end connected to the body 27 of the tap-actuating device which is preferably embedded in the floor. This body 27 comprises a vertical cylinder 28 having slidably fitted therein a control piston 29 provided with a flange 30 movable within a chamber 31 of greater diameter than, and overlying, the cylinder 28. Above the flange 30 on the other hand is a piston extension emerging above the floor surface and consisting of a tapped, square-sectioned portion 32 adapted to receive in its lower portion a screw-threaded valve-holder 33 keeping a purging valve member seated on the upper end of an axial duct 34 formed in the piston 29. The upward movement of this piston 29 is limited by the engagement of its flange 30 with a stop collar 35 through which the piston extension 32 slides and screwed in the upper portion of the chamber 31. Finally, the piston extension 32 has screwed in its upper portion the screw-threaded shank 36 of the pedal proper 37 covered by a cap member 38 of adequate resilient material such as rubber, the peripheral outer edge of this cap bearing directly on the floor surface, as shown. An air vent hole 39 is formed through this cap and pedal assembly. It is apparent that, due to the square-shaped cross-section of the piston extension 32, the stop collar 35 thereon may be screwed in or out at will. Besides, this shape will facilitate the screwing of the purging plug 33 and also of the pedal proper.

The device described and shown herein may also comprise means for adjusting the cross-sectional area available for the liquid of the hydraulic transmission. In the example illustrated, this adjustment is obtained by providing a needle valve 40 screwed in a tapped hole formed in the body 27, the tapered or operative end of the needle valve obturating more or less the passage 41 connecting the cylinder 28 with the pipe line 22.

The operation of the improved pedal-actuated tap according to this invention is as follows:

In its inoperative or closed position the obturator or plug 12 is urged against its seat 4 by the spring 19 as the piston 8 is in its rearmost position as shown in FIG. 1. Under these conditions, the pipe 22 communicates with the water-inlet pipe connection 2, so that the transmission is filled with liquid and pushes the control piston 29 upwards until its flange 30 engages the stop collar 35. When the user depresses the pedal, the overpressure produced in the hydraulic transmission line 22 is immediately operative through the hole 20 to cause the tap piston 8 to move forwards, that is, to the right as seen in FIG. 1, so that this piston will close immediately the orifice 26 through which the leak towards the interior of the tap is kept to a minimum. As the piston 8 subsequently engages the head 10 of the plug rod 11 and continues its travel it carries along the rod and plug against the resistance of the return spring 19 so that the plug is unseated and a water output proportional to the pressure exerted on the pedal is obtained through the tap outlet. If the needle-valve adjustment device 40 is provided, the flow of liquid from the piston chamber 28 to the pipe line 22 may be reduced to avoid the delivery of sudden, excessive liquid outputs.

When the pedal is released, the overpressure in pipe 22 ceases and the piston 8 is returned by the spring 19 to its tap-closing position. When the plug 12 has thus been reseated by the spring 19 the piston 8 continues its return movement to the left (FIG. 1) due to the pressure of the water system, until it uncovers the orifice 26 so that the liquid may complete the filling of the hydraulic transmission, if required, and move the control piston 29 to its uppermost position shown in FIG. 2. The return movement of the control piston 29 to its uppermost or inoperative position is also promoted by the inherent resiliency of the rubber cap 38 acting as a spring in this case. As the obturator closing movement takes place in the upstream direction, that is, in a direction opposite to the normal direction of flow of the liquid through the tap, the water pressure tends to counteract this movement and consequently any risk of water-hammering is positively avoided. However, if necessary the provision of the needle-valve device 40 permits of reducing the velocity at which the tap is closed when the pedal is released for to resume its seated or tap-closing position the plug, through the medium of the piston 8, must firstly force the liquid from the bottom of cylinder 7 through the pipe line 22 and duct 41 controlled by the needle valve 40 to the other cylinder 28.

No liquid excess can flow from the tap to the hydraulic transmission during the opening of the tap for the filling passage is not established since the piston ring 9 is on the right-hand side of the orifice 26.

Of course, many modifications may be brought to the embodiment shown and described herein by way of example; without departing from the spirit and scope of the invention as set forth in the appended claim.

Thus, the axis of the pipe connection 21 has been shown as being parallel to the inlet connection 2 to simplify the drawing, but it will be readily understood that this axis may have a different orientation, even outside a plane perpendicular to the axis of the outlet connection 3.

We claim:

An actuating device for a liquid tap comprising a hollow body having an inlet, adapted to be connected to a source of fluid under pressure, and a cylinder with a closed bottom end and an open end in communication with said inlet, a solid head hollow piston slidably positioned in said cylinder, a rod extending longitudinally of said cylinder, a head on said rod positioned within said hollow piston and having a transverse elongated aperture therethrough, a cross pin fixedly connected to said piston and traversing said aperture providing a lost motion linkage between said rod and said piston in their axial direction, a piston ring on said piston abutting said cylinder, closing the space therebetween, said hollow body having an opening leading to said bottom end of said cylinder, said hollow body further having a small opening leading to said cylinder and being in communication with said cylinder open end when said piston is adjacent said cylinder bottom end for receiving fluid from said hollow body inlet and to which fluid actuating pressure may be applied to expel fluid under pressure through said first-mentioned opening to effect a sliding movement of said piston to positions in said cylinder closing said small opening to said cylinder open end and thereafter effecting movement of said rod.

References Cited in the file of this patent

UNITED STATES PATENTS

| | | |
|---|---|---|
| 1,957,567 | Williams | May 8, 1934 |
| 2,308,478 | Lingold | Nov. 6, 1941 |
| 2,459,613 | Baker | Jan. 18, 1949 |
| 2,826,040 | Fonbrune et al. | Mar. 11, 1958 |
| 2,839,264 | Trubert | June 17, 1958 |

FOREIGN PATENTS

| | | |
|---|---|---|
| 465,888 | Italy | Sept. 29, 1951 |
| 1,013,314 | France | Apr. 30, 1952 |